United States Patent

[11] 3,583,321

| [72] | Inventors | Matthew E. Anderson<br>Ontario;<br>Richard L. Higuera, Riverside, both of Calif.<br>William J. Donahue, Takoma Park; Peter D.<br>Gratton, Simpsonville; Thomas A.<br>Cammack, Beltsville, all of Md. |
|---|---|---|
| [21] | Appl. No. | 779,163 |
| [22] | Filed | Nov. 26, 1968 |
| [45] | Patented | June 8, 1971 |
| [73] | Assignee | The United States of America as represented by the Secretary of the Navy. |

[54] SAFETY AND ARMING DEVICE
3 Claims, 3 Drawing Figs.

| [52] | U.S. Cl. | 102/81 |
|---|---|---|
| [51] | Int. Cl. | F42c 15/26 |
| [50] | Field of Search | 102/70, 79—81 |

[56] References Cited
UNITED STATES PATENTS

| 2,362,123 | 11/1944 | Doe et al. (I) | 102/70 |
| 2,368,747 | 2/1945 | Doe et al. (II) | 102/70 |
| 2,537,855 | 1/1951 | Porter | 102/79 |
| 2,704,033 | 3/1955 | Koeper et al. | 102/81X |
| 3,151,557 | 10/1964 | Evanoff et al. | 102/70 |
| 3,371,608 | 5/1968 | Webb | 102/79X |

*Primary Examiner*—Verlin R. Pendegrass
*Attorneys*—E. J. Brower, J. M. St. Armand and T. M. Phillips ABSTRACT: A pressure-actuated secondary arming interlock for use in a bomblet fuzing device. The interlock consists essentially of a diaphragm-type snap spring and a locking pin which interlocks with the primary arming apparatus and prevents it from arming until the pressure actuated interlock is first exposed to a high-pressure environment. Upon experiencing the proper environment, the diaphragm-type spring snaps into a position which disengages the pin from the primary arming apparatus placing the fuzing device in a condition for arming.

PATENTED JUN 8 1971 3,583,321

MATTHEW E. ANDERSON
RICHARD L. HIGUERA
WILLIAM J. DONAHUE
PETER D. GRATTON
THOMAS A. CAMMACK
  *INVENTORS*

BY *J. M. St. Amand*

ATTORNEYS

SAFETY AND ARMING DEVICE

The invention herein described may be manufactured and used by or for the Government of the United States of America for governmental purposes without the payment of any royalties thereon or therefor.

The present invention relates to an improved safety and arming device. More particularly, it relates to a pressure actuated interlock for use in a spin arming fuzing device.

Safety and arming devices in existing spin arming fuzing devices only require spin about a principal axis in order to arm. When used in bomblets, such safety and arming devices present a danger of accidental arming and firing, due simply to rolling, if inadvertently dropped or spilled onto the deck of a ship.

An object of the present invention is to provide a second arming interlock for use in a spin-arming bomblet-fuzing device which eliminates the potential hazard of having the fuzing device detonate as a result of spin in handling.

Another object of the present invention is to supply an additional safety feature for use in a spin-actuating fuzing device by providing a pressure-actuated interlock which precludes the fuzing device from arming and firing until a unique, post launch, high gas pressure environment is sensed by said fuzing device.

These objects are accomplished by providing a pressure-activated interlock for use in connection with a spin-actuating fuzing device which arms in response to spin about its principal axis. Said pressure-actuated interlock comprises a diaphragm-type spring and a pin which interlocks with the spin-arming apparatus and prevents it from arming in response to spin about its principal axis unless the pressure-actuated interlock is first exposed to a high gas pressure environment. Upon experiencing said high gas pressure environment, the diaphragm-type spring snaps into a position which disengages the pin from the spin-arming apparatus and allows the fuze to arm in response to spin about its principal axis.

Other objects and many of the attendant advantages of this invention will become readily appreciated as the same becomes better understood by reference to the following detailed description when considered in connection with the accompanying drawings wherein.

Figure 1:
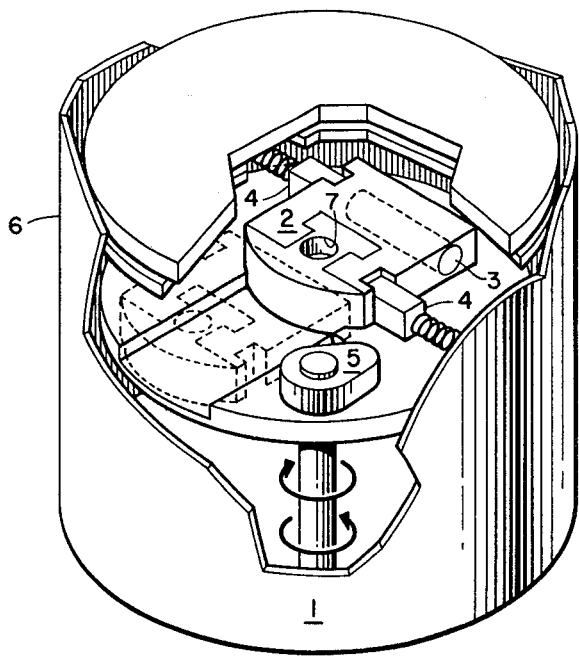
FIG. 1 is a partial perspective view showing a spin-arming fuzing device to which the pressure-actuated interlock of the present invention may be applied.

Referring to FIG. 1, the primary arming interlock of a spin-arming bomblet fuze 1 comprises a slider weight 2 containing a detonator 3, and a pair of spring loaded detents 4. The slider weight 2 is positionable so that the firing pin 5 is aligned with the detonator 3 but the detents 4 prevent such alignment until the fuzing device achieves a predetermined rotational velocity. When the predetermined rotational velocity is achieved, the resultant centrifugal force causes the two spring detents 4 to move outward from the center of the fuze housing 6, thus unlocking the slider weight 2. At an increased predetermined rotational velocity, the resultant centrifugal force causes the slider weight 2 to translate into the position shown by the dotted lines in FIG. 1. In this translated position the detonator 3 is aligned with the firing pin 5 and the bomblet fuze is armed.

The spin required to arm the fuze 1, which is positioned within the center of a bomblet, is imparted by vanes positioned on the periphery of the bomblet which cause is to spin when dispersed from the parent weapon.

Figure 2:
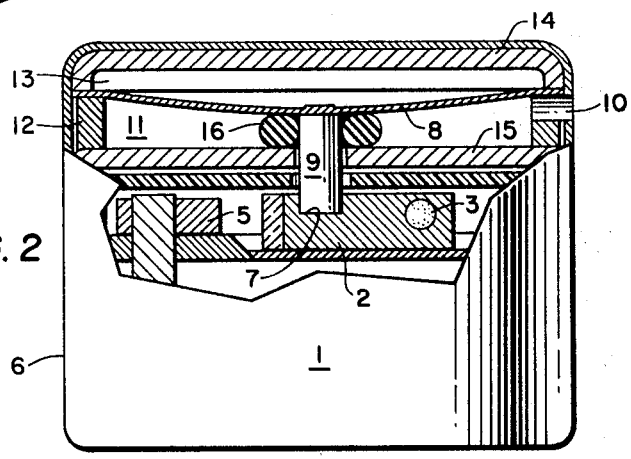
FIG. 2 is a breakaway view of a fuzing device showing the pressure-actuated interlock of the present invention in its safety position.

Referring to FIG. 2, the pressure-actuated interlock of the present invention provides the fuzing device with a second arming interlock. It consists essentially of a diaphragm-type snap spring 8 and a locking pin 9 which is engageable with the slider weight 2. The diaphragm-type snap spring 8 has a bowed surface and is of the type that will snap through center when deflected to a particular point. It requires a negative loading to return the spring to the original position. Said diaphragm-type snap spring 8 is positioned above the primary interlock and secured to the periphery of the sidewall 12 of the fuze housing 6 so as to form a chamber 11. The space 13 above the diaphragm-type snap spring 8 is bounded by the top wall of the fuze housing 14, the periphery of the sidewall 12 and the snap spring 8. This space 13 is not exposed to the atmosphere surrounding the fuzing device 1. Said chamber 11 is bounded by the periphery of the sidewall 12, the diaphragm-type snap spring 8 and insert 15 which is positioned above the primary arming interlock.

The sidewall 12 of the fuze housing 6 contains at least one opening 10 into the chamber 11 for providing a passage between the chamber 11 and the atmosphere surrounding the fuzing device 1. The pin 9 is rigidly secured to the diaphragm-type spring 8 and positioned so that it is insertable through insert 15 into the opening 7 located in the slider weight 2. An o-ring 16 is positioned around said pin 9 so as to provide a seal at the point where the pin 9 passes through insert 15. In a prelaunch environment the diaphragm-type snap spring 8 is bowed toward the slider weight 2 and the pin 9 is inserted in the opening 7 thus locking the slider weight 2 and preventing it from translating to an armed position.

Figure 3:
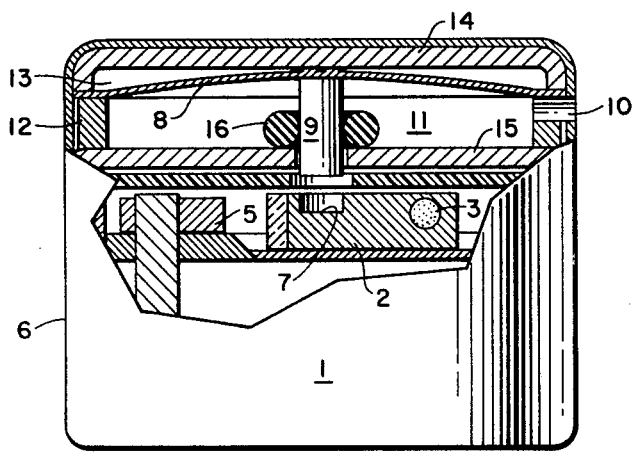
FIG. 3 is a breakaway view of a fuzing device showing the pressure-actuated interlock of the present invention in its released position.

Upon the application of a high-pressure gas which enters chamber 11 through opening 10, the diaphragm-type snap spring 8 passes through its center position and detents into a raised position as shown in FIG. 3. When the snap spring 8 is in this position the pin 9 is removed from the opening 7 in the slider weight 2 and the fuzing device is free to arm in the manner described above.

In operation, the fuzing device 1 would only be exposed to the high-pressure gas after the parent weapon had been launched and had reached a safe separation distance from the launch craft. Admission of the high-pressure gas to the bomblets can be controlled by the safety and arming device of the parent weapon. It would also be possible to make the pressure actuated interlock sensitive to a short pulse of pressure by incorporating a very small hole in the fuze housing 6 behind the diaphragm 8. This would prevent arming from a slowly applied pressure since the gas could then bleed into space 13 in back of the diaphragm 8. Such a pulsed pressure may be desirable to eliminate the possibility of removing this safety interlock by the immersion of the fuzing device in a liquid.

What we claim is:

1. A safety and arming system for a spin-arming bomblet fuzing device of the type which is dispersed from a parent weapon after the parent weapon has been launched and reached a safe separation distance from a launch craft, comprising:
   a. a fuze housing,
   b. a primary arming and interlock means in said fuze housing comprising:
      1. a firing pin,
      2. a slider weight containing a detonator operable to be aligned with said firing pin by a predetermined centrifugal force,
      3. detent means operable to prevent said slider weight from aligning the detonator with said firing pin until a predetermined rotational velocity is achieved following dispersion from the parent weapon,
   c. a secondary pressure sensitive arming interlock means in said fuze housing, comprising:
      1. a diaphragm-type snap spring,
      2. a locking means on said diaphragm spring which is engageable with said slider weight means and operable to also prevent said slider weight from aligning the detonator with said firing pin,
      3. said diaphragm snap spring positioned in said fuze housing to form a closed chamber therein, the inside of which is not exposed to the atmosphere, in the parent weapon which surrounds said fuze housing, predetermined pressure outside said chamber being required to snap said diaphragm spring away from said slider means and disengage said locking means from said slider weight means, 4. at least one opening in said fuze housing exposing the outside of said diaphragm snap spring to the surrounding atmosphere in the parent weapon, d. said secondary arming interlock means operable to disengage said slider weight to allow the weight to translate to an armed position upon exposure of the outside of said diaphragm snap spring to a predetermined high-pressure atmosphere within said parent weapon prior to dispersion therefrom.

2. A safety and arming device as in claim 1 wherein said diaphragm-type snap spring is engageably positioned with respect to said primary arming and interlock means to prevent it from arming until said secondary pressure-actuated arming interlock experiences a high-pressure environment which permanently disengages it from said primary arming means.

3. A safety and arming device as in claim 1 wherein said secondary pressure sensitive arming interlock is operable only to a short pulse of predetermined pressure.